J. H. YOUNG.
METHOD OF MAKING VARNISH.
APPLICATION FILED APR. 22, 1920.
1,432,511. Patented Oct. 17, 1922.
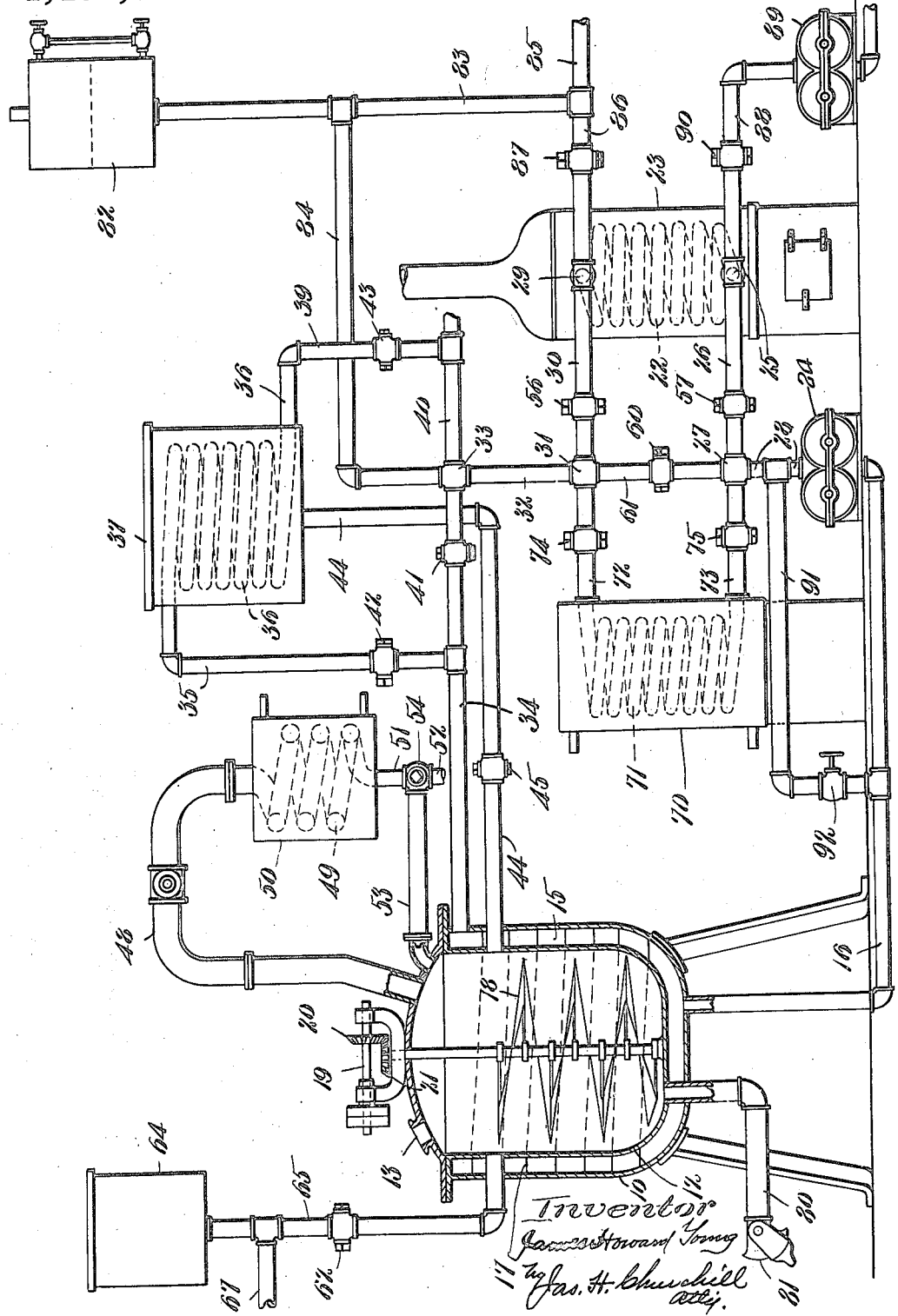

Patented Oct. 17, 1922.

1,432,511

UNITED STATES PATENT OFFICE.

JAMES HOWARD YOUNG, OF PITTSBURGH, PENNSYLVANIA, ASSIGNOR TO H. H. ROBERTSON COMPANY, OF PITTSBURGH, PENNSYLVANIA, A CORPORATION OF PENNSYLVANIA.

METHOD OF MAKING VARNISH.

Application filed April 22, 1920. Serial No. 375,807.

*To all whom it may concern:*

Be it known that I, JAMES HOWARD YOUNG, a citizen of the United States, residing in Pittsburgh, county of Allegheny and State of Pennsylvania, have invented an Improvement in Methods of Making Varnish, of which the following description, in connection with the accompanying drawings, is a specification, like characters on the drawings representing like parts.

This invention relates to a method of making varnish, and has for its object to produce a superior varnish at a minimum cost and with a minimum labor.

The ordinary varnish is composed essentially of a resin, an oil, and a thinner. The resins usually employed are the socalled Kauri, Manila and Zanzibar gums, also resin, resinates and other resins such as Borneo and Congo copals.

The oil usually employed is linseed or other drying oil, and the thinning liquid is usually turpentine or the like.

In accordance with this invention, the resins are heated in a closed vessel by means of a heated liquid, which is circulated about the said vessel so as to heat the bottom and sides thereof and thus uniformly heat the resins to melt the same. When the resins are properly heated, the oil is added thereto, and the mixture of oil and resins is subjected to the heat of the circulating liquid for a sufficient length of time to cook the mixture, which then has its temperature reduced sufficiently to permit the thinning liquid, to wit, the turpentine, to be safely added thereto. The reduction in temperature of the cooked mixture may and preferably will be effected by the circulating liquid, which is caused to circulate in a different circuit, in which it acts to transfer the heat absorbed from the cooked mixture in the closed vessel to another body, preferably a batch of oil. After the thinner has been added to the cooked mass or mixture, the latter is rapidly cooled by utilizing the circulating liquid, which is caused to circulate through a third circuit containing a condenser. The volatile products driven off from the resins when the latter are melted, are recovered as will be described, and the volatile products driven off from the thinning liquid when the latter is admitted to the closed vessel, are recovered and led back into said vessel, as will be described. The temperature to which the contents of the closed vessel are subjected, may be accurately controlled by adjusting or regulating the flow of the circulating heating liquid, and overheating of the contents thereby avoided. Provision is made for stirring the contents of the closed vessel as will be described.

These and other features of this invention will be pointed out in the claims at the end of this specification.

The drawing represents diagrammatically an apparatus with which to practice the improved method of making varnish.

Referring to the drawing, 10 represents the jacket of a kettle or closed vessel 12 provided in its top with a suitable opening 13, through which the resins are placed in the said vessel, and which is designed to be closed by a suitable cover, not shown.

The jacket 10 co-operates with the bottom and sides of the vessel 12 to form a space 15, into which a heating liquid is introduced through a pipe 16 connected with the bottom of the jacket. The space 15 contains suitable means, preferably baffle plates 17 to direct the heating liquid around the kettle 12, so that the hot liquid will come in contact with the bottom and sides of the kettle and thereby uniformly heat the contents of the latter and thereby avoid local overheating of the contents. The kettle contains a stirring mechanism 18 of any suitable construction, which is driven from a shaft 19 through gears 20, 21 and by means of which the contents of the kettle are agitated. The jacket 10 is connected in a closed circuit, which may be designated the main or heating circuit, and which includes a coil 22 in a heater 23, a pump 24 having its inlet port connected with the outlet end 25 of the heating coil 22 by pipe 26, fitting 27, and pipe 28, and having its outlet port connected with the space 15 by the pipe 16. The inlet end 29 of the heating coil 22 is connected with the upper end of the jacket 10 by pipe 30, fitting 31, pipe 32, fitting 33 and pipe 34.

The heating fluid is circulated through the closed heating circuit by the pump 24, which takes it from the heater and forces it through the jacket of the kettle and back to the heater.

Provision is made for utilizing the heating liquid for heating the linseed or other oil while the resins in the kettle are being melted. To this end the outlet pipe 34 for the jacket is connected by the pipe 35 with one end of a heating coil 36 in a tank 37, the other end of said coil being connected by pipe 39, 40, with the fitting 33. The heating coil 36 is thus tapped off from the main heating circuit and may be included therein by closing a valve 41 in the pipe 34 and opening valves 42, 43, in the pipes 35, 39, or it may be cut off from the main circuit by closing the valves 42, 43, and the main circuit re-established by opening the valve 41. The oil heated in the tank 37 may be delivered into the kettle 12 through a pipe 44, which is provided with a valve 45 for controlling the supply of heated oil to the kettle.

The main heating circuit is used while the resins in the kettle are being melted, and during the melting of the resins they are agitated by the stirrer 18 and the volatile products given off therefrom are recovered by connecting the top of the kettle by a pipe 48 with one end of a coil 49 located in a condenser 50 and having its other end connected with a valve casing 51 having an outlet pipe 52, which leads to a suitable receptacle, not shown, for the volatile products of the resins.

The valve casing 51 is also connected by a pipe 53 with the kettle 12 and the valve 54 controls both outlet pipes, so that when the pipe 52 is connected with the coil 49, the pipe 53 is closed and vice versa.

After the heated oil has been admixed with the melted resins in the closed kettle, the heating liquid is circulated through the main circuit until the mixture of oil and resins has been properly cooked or heated, which may take several hours. The temperature of the contents of the kettle at the end of the cooking operation may be as high as 500° F., which is entirely too hot to allow of satisfactory introduction of the turpentine or other thinning liquid, and therefore provision is made for reducing the temperature of the cooked mixture to a point where the turpentine can be introduced with safety. Provision is made for rapidly reducing the temperature of the cooked mixture, and for utilizing the heating liquid for this purpose. To this end, the valves 56, 57, in the pipes 30, 26, are closed to cut out the heater 23; the valve 41 is closed, the valves 42, 43, are opened, and a valve 60 in a pipe 61 connecting the fittings 31, 27, is opened. A second circuit for the liquid formerly used for heating the kettle and its contents, is thus established outside of the heater, and through which the liquid is circulated to absorb heat from the kettle and its contents and impart it to the oil in the tank 37, which oil may be that used for a second batch of resin. The second circuit may be traced as follows: From the pump 24 through pipe 16 to jacket 10, thence by pipes 34, 35, to the coil 36, thence by pipes 39, 40, to fitting 33, thence by pipe 32, fitting 31, pipe 61, fitting 27 and pipe 28 to the pump 24.

When the temperature of the kettle and its contents have been reduced the proper or desired amount, the turpentine or other thinner may be supplied to the kettle 12 from a tank 64 through a pipe 65 provided with a valve 62.

At first, much of the turpentine would be volatilized and would escape through the pipe 48 into the condenser coil 49, where it would be condensed and returned back into the kettle through the pipe 53, the valve 51 being turned to close the outlet pipe 52 and connect the pipe 53 with the condenser coil 49. The outlet pipe 65 for the turpentine supply tank is shown as provided with a branch pipe 67, which may lead to a second kettle not shown. After the turpentine has been added, the temperature of the thinned mixture or finished varnish would in most cases be too high to permit of satisfactorily handling the same, and therefore provision is made for rapidly cooling the finished varnish. To this end, a third circuit for the circulating liquid is provided, which circuit includes a relatively large condenser 70, whose coil 71 has its opposite ends connected by pipes 72, 73, with the fittings 31, 27, and said pipes are provided with valves 74, 75.

When the third circuit is established, the valves 41, 74, 75, are opened, and the valves 42, 43, 60, are closed.

Under these conditions, the liquid is circulated by the pump 24, through the pipe 16, jacket 10, pipe 34, fitting 33, pipe 32, fitting 31, pipe 72, condenser coil 71, pipe 73, fitting 27, and pipe 28 back to the pump.

If desired, the coil 36 may be included in the third circuit by closing the valve 41 and opening the valves 42, 43. In this case, the liquid is circulated by the pump to the jacket 10 and thence by pipes 34, 35, coil 36, pipes 39, 40, fitting 33, pipe 32, fitting 31, pipe 72, condenser coil 71, back to the pump as above described.

When the finished varnish has been cooled as described, it may be drawn off from the kettle 12 through the outlet pipe 80 provided with a suitable valve 81.

The circulating liquid may be supplied to the heating and cooling circuits from a reservoir 82 by pipes 83, 84, and to like circuits of a second apparatus by pipe 85 connected with the heating coil 22 by pipe 86 provided with a valve 87, said heating coil having connected with its other end the inlet pipe 88 of a pump 89, the pipe 88 being provided with a valve 90. A by-pass for the pump 24 may and preferably will be provided by connecting the inlet pipe 28 with the outlet pipe 16 by a pipe 91 provided with a valve 92 to control said by-pass.

One arrangement of apparatus with which to practice the method of making varnish is herein shown, but it is not desired to limit the invention to the particular apparatus shown.

The heating liquid may be any liquid which will withstand the temperature required and which will not attack chemically its containing vessels and pipes. It is preferred to use a petroleum distillation product of high flash point and little affected by high temperatures.

By means of the method and apparatus above described, the following advantages are obtained. A light colored varnish may be produced, inasmuch as a more accurate temperature control is possible and local superheating of the resin, which results in a darkened varnish, is avoided. Large batches of varnish of uniform quality may be produced. A material saving is effected of the volatilized hydrocarbons from the melting resins, and of the thinner. The fire hazard is eliminated because of the closed system. Less space is required to reach a given output and lower labor charge per gallon of finished product is effected.

Claims.

1. The process of making varnish, which consists in uniformly heating resin in a closed vessel by a liquid circulated about said vessel, simultaneously heating oil by said circulating liquid, admitting the heated oil into said closed vessel to admix with the melted resin, heating the mixture of resin and oil by said circulating heating liquid to cook said mixture, partially cooling the cooked mixture by circulating the liquid about the vessel at a lower temperature than that employed for heating the mixture, admixing a liquid thinner with said partially cooled cooked mixture in said vessel, and rapidly cooling the thinned cooked mixture by circulating the liquid at a still lower temperature.

2. The method of making varnish, which consists in circulating a heating liquid about a vessel containing resin to uniformly heat and melt the latter, mixing oil with the melted resin, cooking the mixture of oil and resin by the circulating heated liquid, partially cooling the cooked mixture by circulating the liquid about the vessel at a lower temperature, admixing a liquid thinner with said partially cooled cooked mixture, and rapidly cooling the thinner cooked mixture with the heating liquid at a still lower temperature.

3. The method of making varnish, which consists in heating a liquid, circulating said heated liquid about a vessel containing resin to uniformly heat and melt the latter, admixing oil with said melted resin, circulating the heated liquid about said vessel to cook the mixture of oil and resin, circulating the said liquid at a reduced temperature about said vessel to partially cool the cooked mixture, thinning the cooked mixture, and circulating the said liquid at a still lower temperature about said vessel to finally cool said thinned cooked mixture.

4. The method of making varnish, which consists in melting resin by heat from circulating heated liquid, admixing oil with said melted resin, cooking the mixture of oil and resin by heat from circulating liquid, partially cooling cooked mixture with circulating liquid, thinning partially cooled cooked mixture, and rapidly cooling the thinned cooked mixture with circulating liquid.

5. The method of making varnish, which consists in melting resin by heat from a circulating liquid heated to a relatively high temperature, recovering the volatile hydrocarbons driven off from said resin, admixing oil with said resin, cooking the mixture of oil and resin by heat from said circulating heated liquid, partially cooling the cooked mixture with the circulating liquid at a lower temperature, thinning the partially cooked mixture with a suitable liquid, recovering the volatile products of the thinning liquid, and rapidly cooling the cooked mixture with the circulating liquid at a still lower temperature.

6. The method of making varnish, which comprises cooking a mixture of resin and oil by heat from a circulating liquid heated to a relatively high temperature, partially cooling said cooked mixture with the circulating liquid at a lower temperature, thinning the partially cooled cooked mixture, and cooling the thinned mixture with the circulating liquid at a still lower temperature.

7. The method of making varnish, which comprises heating a liquid to a relatively high temperature and circulating it about a vessel containing a mixture of resin and oil to impart to the latter heat from said circulating liquid, cutting off the heat from said liquid to reduce the temperature thereof and circulating the liquid at said reduced temperature about said vessel to absorb heat from the mixture of resin and oil and thereby reduce the temperature of the said resin and oil.

In testimony whereof, I have signed my name to this specification.

JAMES HOWARD YOUNG.